(12) United States Patent
Morita et al.

(10) Patent No.: US 6,486,938 B1
(45) Date of Patent: Nov. 26, 2002

(54) LINE EXPOSURE TYPE IMAGE FORMING APPARATUS

(75) Inventors: Akio Morita, Wakayama (JP); Tomoyuki Ishii, Wakayama (JP)

(73) Assignee: Noritsu Koki Co., Ltd., Wakayama (JP)

( * ) Notice: Subject to any disclaimer, the term of this patent is extended or adjusted under 35 U.S.C. 154(b) by 58 days.

(21) Appl. No.: 09/704,277

(22) Filed: Nov. 1, 2000

(30) Foreign Application Priority Data

Nov. 4, 1999 (JP) ............................................ 11-313786

(51) Int. Cl.⁷ ............................ G02B 26/08; G03B 27/52
(52) U.S. Cl. ............................ 355/32; 355/35; 347/225; 347/241; 359/292
(58) Field of Search ............................ 355/40, 41, 77, 355/32, 35; 347/241, 239, 224, 225; 359/292

(56) References Cited

U.S. PATENT DOCUMENTS 5,933,183 A  8/1999  Enomoto et al. ............ 359/224
5,953,103 A  9/1999  Nakamura .................... 355/32
5,982,407 A * 11/1999 Enomoto et al. ............ 347/239

* cited by examiner

*Primary Examiner*—D Rutledge
(74) *Attorney, Agent, or Firm*—Fulbright & Jaworski L.L.P.

(57) ABSTRACT

A line exposure type image forming apparatus having a micromirror device 40 with numerous micromirrors 41 tiltable for reflecting light incident from a light source to a predetermined exposure position on a photosensitive material 2, and a sub-scan moving mechanism 8a for moving the photosensitive material relative to the exposure position. The micromirror device is disposed such that an imaginary line linking imaging positions on the photosensitive material of the micromirrors in a predetermined line is at an angle to a direction of relative movement of the photosensitive material. As a result, an exposure dot line is produced on the photosensitive material in a main scanning direction perpendicular to the direction of relative movement by a main scanning mirror set formed of micromirrors selected in a direction at an angle to a direction of the columns of the micromirror device.

17 Claims, 9 Drawing Sheets

LINE EXPOSURE TYPE IMAGE FORMING APPARATUS

BACKGROUND OF THE INVENTION

1. Field of the Invention

This invention relates to a line exposure type image forming apparatus including a micromirror device having numerous micromirrors arranged in a matrix of rows and columns, each micromirror being tiltable between an exposing posture for reflecting light incident from a light source to a predetermined exposure position on a photosensitive material and a non-exposing posture for reflecting light to a location other than the photosensitive material, a sub-scan moving mechanism for moving the photosensitive material relative to the exposure position, and a mirror controller for controlling the postures of the micromirrors in response to image signals.

2. Description of the related Art

The micromirror device is also called a DMD (Digital Micromirror Device) which actuates, by action of electrostatic fields, square micromirrors of high reflectance formed on a wafer by aluminum sputtering, each with a side measuring approximately 16 (m. Several hundreds of thousands to a million of these micromirrors are squeezed into a matrix form on a silicon memory chip by CMOS semiconductor technique. Each micromirror can swing about a diagonal to tilt to two steady postures about (10 degrees relative to the horizontal. This micromirror device usually is employed, with each micromirror corresponding to one pixel, in a digital display system for projecting digital images on a screen by controlling a reflection time of light from a light source.

The micromirror device may be used to form exposure dots in selected positions on a photosensitive material, with each micromirror, in one of the two steady postures, reflecting the light from the light source to a predetermined position on the photosensitive material, and in the other posture, reflecting the light outside the region of the photosensitive material. Further, the exposure dots may be given a desired gradient by controlling irradiation time when producing the exposure dots. The micromirror device may thus be employed also in a line exposure type image forming apparatus which forms images on a photosensitive material by moving the photosensitive material relative to the irradiating positions of the micromirrors. Such image forming apparatus are known from U.S. Pat. No. 5,953,103, U.S. Pat. No. 5,933,183 and Japanese Patent Application Laying-Open Publication S10-104753, for example.

However, each of the above conventional apparatus makes use of a micromirror device designed for a digital display system. This micromirror device is not necessarily optimal for a line exposure type image forming apparatus. For example, the resolution of exposure dot images formed on a photosensitive material is dependent on the degree of mirror integration of the micromirror device. A micromirror device enabling an XGA screen resolution has 768 pixels vertically and 1024 pixels horizontally. Even where the rows, which are the longer, are used as lines to effect line exposure, and where photographic paper of 100 mm in width is used as a photosensitive material, the resolution will be about 250 dpi. Thus, demands for a higher resolution cannot be met. It is possible to double the resolution by using two identical micromirror devices, but this will entail an excessive increase in cost.

SUMMARY OF THE INVENTION

The object of this invention is to provide a line exposure type image forming apparatus employing a micromirror device, which realizes improved resolution while avoiding an increase in cost.

The above object is fulfilled, according to this invention, by a line exposure type image forming apparatus having a micromirror device disposed such that an imaginary line linking imaging positions on the photosensitive material of the micromirrors in a predetermined line is at an angle to a direction of relative movement of the photosensitive material, and an exposure dot line is produced on the photosensitive material in a main scanning direction perpendicular to the direction of relative movement by a main scanning mirror set formed of micromirrors selected in a direction at an angle to a direction of the columns of the micromirror device.

In this construction, the rectangular micromirror device is set to an oblique posture to utilize, as an exposure line, micromirrors disposed along an oblique line, instead of micromirrors in a vertical line (direction of rows) or micromirrors in a horizontal line (direction of columns). This allows use of a larger number of micromirrors as the exposure line than where micromirrors in a vertical or horizontal line are used.

To allocate a maximum number of micromirrors to the exposure line, use may be made of micromirrors disposed along a diagonal of the rectangular micromirror device, for example. As a result, numerous micromirrors arranged around the diagonal are in a pixel shifting positional relationship. An appropriate selection of micromirrors to be used in time of printing will allow for a remarkable improvement in resolution.

Where the above-mentioned oblique line acting as basis for selecting micromirrors to be used as the exposure line is inclined at 45 degrees, light beams reflected by the micromirrors conveniently have a uniformed overlapping of luminance distributions. Thus, in a preferred embodiment of this invention, where the micromirror device is rectangular, i.e. where the micromirrors are arranged in a matrix of m rows and n columns, m being smaller than n, the main scanning mirror set is formed of a plurality of subsets each having a predetermined number of micromirrors selected in a direction at an angle of 45 degrees to the direction of the columns of the micromirror device. The exposure dot lines produced by the subsets are shifted 5 from each other in the direction of relative movement of the photosensitive material (usually called the sub-scanning direction). In practice, however, a single straight exposure dot line is formed on the photosensitive material by the technique of controlling timing of driving the micromirrors in the sub-scanning direction. Since the micromirrors in each subset are arranged along a line inclined at 45 degrees, light beams reflected by the micromirrors have a uniformed overlapping of luminance distributions. The scanning mirror set is divided into a plurality of subsets as noted above. These subsets are shifted from one another only by a small amount. Thus, even where the light source has variations in luminance distribution, differences in luminance of incident light beams are negligible.

Where variations in luminance distribution of the light source are immaterial, it is proposed, as another embodiment of this invention in which the micromirror device is rectangular, that the main scanning mirror set is formed of a first subset having a predetermined number of micromirrors selected in a direction extending from one end of a diagonal of the matrix at an angle of 45 degrees relative to the columns of the micromirror device, and a second subset having a predetermined number of micromirrors selected in a direction extending from the other end of the diagonal at an angle of 45 degrees relative to the columns of the micromirror device. In this construction, the number of subsets is only two, which simplifies the timing control of the micromirrors to absorb the shift in the sub-scanning direction between the exposure dot lines produced by the subsets.

In a further preferred embodiment of this invention, at least three main scanning mirror sets are formed to produce exposure dots, each struck by light beams from different micromirrors for color exposure. This construction forms color exposure dots of high quality with color discrepancy restrained, thereby forming a high quality color image. In this case, three or more, preferably a multiple of three, main scanning mirror sets may be formed to produce exposure dots of at least one color, preferably three colors, struck by light beams from different micromirrors for color exposure. Then, the quantity of radiation to form each exposure dot may be distributed to a plurality of micromirrors. This results in an increase in the speed of movement in the sub-scanning direction, i.e. the speed of the exposing process. In a still further preferred embodiment of this invention, the main scanning mirror set, and an interpolative main scanning mirror set formed of micromirrors for producing exposure dots between exposure dots produced by the micromirrors of the main scanning mirror set, produce an exposure dot line of increased resolution. This construction effects so-called pixel shifting only by the technique of controlling timing of driving the micromirrors in the sub-scanning direction. The exposure dots thereby formed have a twofold resolution. Other features and advantages of this invention will be apparent from the following description of the embodiments to be taken with reference to the drawings.

DESCRIPTION OF THE PREFERRED EMBODIMENTS

Figure 1:
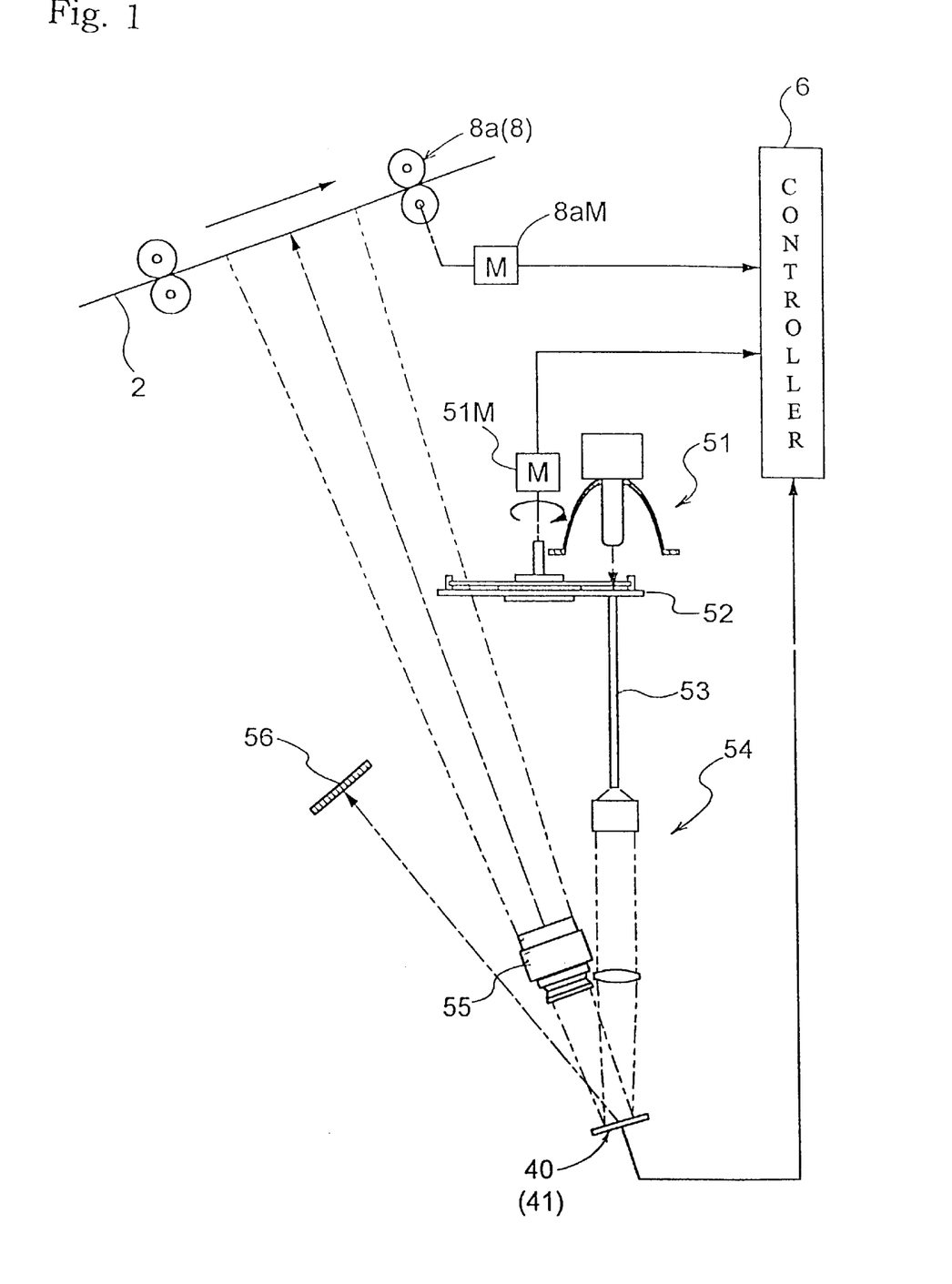
FIG. 1 is a schematic view of an exposure engine employed in an image forming apparatus according to this invention.
Figure 2:
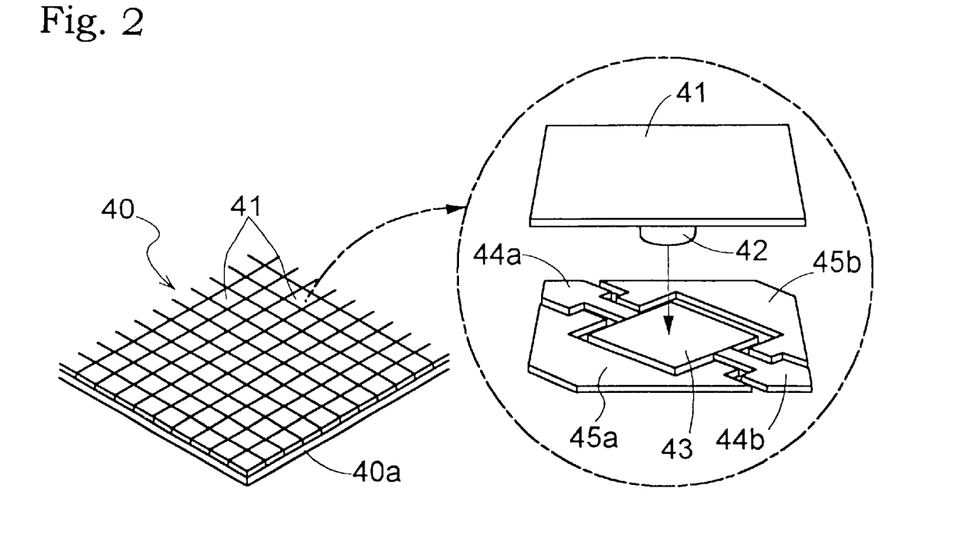
FIG. 2 is a schematic perspective view illustrating a construction of micromirrors.

Embodiments of this invention will be described hereinafter with reference to the drawings. FIG. 1 schematically shows an exposure engine 4 forming a core portion of a line exposure type image forming apparatus according to this invention. This exposure engine 4 includes a white light source 51 in the form, for example, of a halogen lamp, a rotating filter 52 circumferentially divided by a predetermined central angle into RGB filter regions and disposed so that each filter region is movable into the optical axis of light beams emitted from the light source 51, an integrating rod 53 acting as a light guide for guiding, without diffusing, the light beams transmitted through the rotating filter 52, a condenser lens unit 54 for condensing the light beams guided by the integrating rod 53, a micromirror device 40 having numerous micromirrors 41 for selectively reflecting the light beams incident from the condenser lens unit 54 in two directions as described in detail hereinafter, an imaging lens unit 55 for forming images of the light beams reflected by the micromirrors 41 in one direction on photographic paper 2 acting as a photosensitive material, and a shielding member 56 for absorbing the light beams reflected by the micromirrors 41 in the other direction. The rotating filter 52 is rotatable by a motor 51M, whereby RGB color light beams successively impinge on the micromirrors 41 of micromirror device 40 at predetermined intervals. As shown in FIG. 2, the micromirror device 40 defines numerous micromirrors 41 arranged in a matrix of numerous rows and numerous columns on a silicon substrate 40a. Each micromirror 41 is square with a side measuring approximately 16 (m, and is spaced from adjacent micromirrors 41 by 1 (m. Each micromirror 41 is placed on a yoke 43 through a support post 42. The yoke 43 is oscillatably supported above the silicon substrate 40a by torsion hinges 44a and 44b extending from opposite sides of the yoke 43 along one diagonal of micromirror 41. Further, a first electrode 45a and a second electrode 45b are formed peripherally of the yoke 43 below opposite ends of the other diagonal of micromirror 41.

In this micromirror device 40, an electrostatic force occurring from the polarities of a voltage applied to the first electrode 45a and second electrode 45b causes each micromirror 41 to swing clockwise or counterclockwise, while twisting the torsion hinges 44a and 44b, thereby to tilt its surface. The voltage supply to the first electrode 45a and second electrode 45b is controlled by a controller 6. Specifically, the micromirror 41 remains horizontal when no voltage is supplied to the first electrode 45a or second electrode 45b. With positive polarity applied to the first electrode 45a and negative polarity to the second electrode 45b, the micromirror 45 tilts in one direction to form a tilt angle +(.With negative polarity applied to the first electrode 45a and positive polarity to the second electrode 45b, the micromirror 45 tilts in the other direction to form a tilt angle ((.

Figure 3:
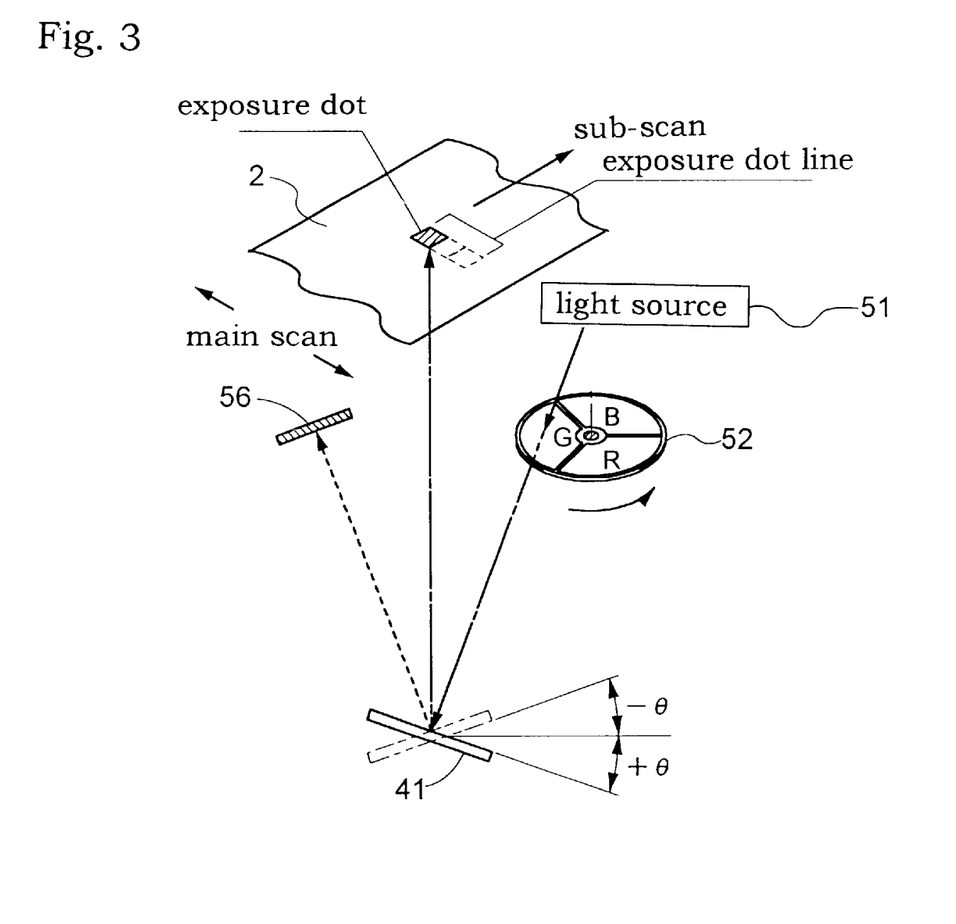
FIG. 3 is an explanatory view showing an exposing state of the micromirrors.

The exposure engine 4 may be constructed with the micromirror device 40 properly arranged by utilizing such tilting characteristics of the micromirrors 41. Thus, as schematically shown in FIG. 3, when the micromirror 41 is tilted to the tilt angle: +(, a light beam emitted from the light source and reflected by the micromirror 41 reaches the photographic paper 2 and forms an exposure dot thereon. When the micromirror 41 is tilted to the tilt angle: ((, the light beam emitted from the light source and reflected by the micromirror 41 reaches the shielding member 56. The micromirror 41 is herein referred to as being in exposing tilt posture when tilted to the tilt angle: +(, and being in non-exposing tilt posture when tilted to the tilt angle: ((.

Exposure dots of RGB colors may be formed on the photographic paper 2, with the rotating filter 52 rotated by the motor 51 to cause light beams of RGB colors to strike the micromirrors 41 of micromirror device 40 at predetermined intervals. A period for irradiating the photographic paper 2 with a light beam is dependent upon a period for maintaining the micromirror 41 at the tilt angle: + theta. Thus, a tilt control for the micromirror 41 may be carried out with a signal whose pulsewidth is modulated based on a density level of each pixel constituting image data, whereby an exposure dot formed on the photographic paper 2 may be given a gradient corresponding to the density level of the pixel.

In time of exposure, the photographic paper 2 is transported in a so-called sub-scanning direction relative to irradiating points of the light beams from the micromirrors 41, whereby an image is formed on the photographic paper 2. This transporting operation is performed by an auxiliary scan moving mechanism 8a acting as the exposure transport unit which forms part of a paper transport mechanism 8. A group of micromirrors 41 forming an exposure dot line defined by exposure dots arranged in a main scanning direction perpendicular to the sub-scanning direction is called herein a main scanning mirror set.

In this invention, the above main scanning mirror set in the micromirror device 40 is formed in a unique way. The basic principle of this formation will be described with reference to FIG. 4.

Figure 4:
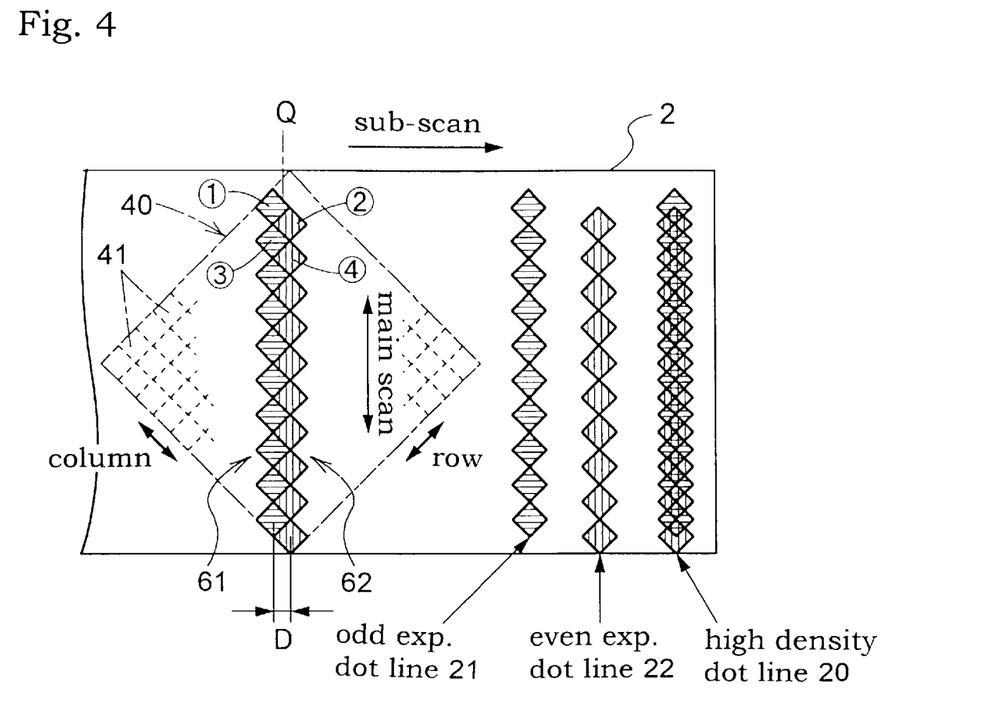
FIG. 4 is an explanatory view showing an arrangement of a main scanning mirror set and an interpolative main scanning mirror set in a micromirror device, and an appearance of exposure dot lines.

Conventionally, a main scanning mirror set is a predetermined row or column of micromirrors 41 arranged in matrix form. In this invention, the main scanning mirror set is a group of micromirrors 41 selected along a direction at an angle to the rows or columns of the matrix. In FIG. 4, the main scanning mirror set is selected along a direction: Q which is at an angle of 45 degrees to the rows or columns of the matrix (i.e. along a diagonal where the micromirror device 40 is square). Consequently, numerous micromirrors arranged around the diagonal, other than the main scanning mirror set, are in a pixel shifting positional relationship. These micromirrors may be used appropriately to realize a remarkable improvement in resolution. For this purpose, as seen in FIG. 4, an interpolative main scanning mirror set 62 is formed of micromirrors 41 adjacent the main scanning mirror set 61.

The micromirrors 41 constituting the main scanning mirror set 61 and interpolative main scanning mirror set 62 are labeled No. 1, No. 2, No. 3 and so on from top to bottom (which are denoted simply with numerals in circles in FIG. 4). Then, the micromirrors constituting the main scanning mirror set 61 have odd numbers, while the micromirrors constituting the interpolative main scanning mirror set 62 have even numbers. When all the micromirrors 41 in the main scanning mirror set 61 are placed in the exposing tilt posture, an exposure dot line is formed by light beams reflected by all the micromirrors 41 that have odd-numbered places in order. This exposure line will be called hereinafter an odd number exposure dot line 21. When all the micromirrors 41 in the interpolative main scanning mirror set 62 are placed in the exposing tilt posture, an exposure dot line is formed by light beams reflected by all the micromirrors 41 that have even-numbered places in order. This exposure line will be called hereinafter an even number exposure dot line 22.

The main scanning mirror set 61 and interpolative main scanning mirror set 62 are shifted relative to each other by an amount: D in the sub-scanning direction. By shifting the timing of forming exposure dots with the interpolative main scanning mirror set 62 by a time corresponding to the amount: D, the odd number exposure dot line 21 and even number exposure dot line 22 may overlap each other. The exposure dots produced by the interpolative main scanning mirror set 62 may be interpolated right between the exposure dots formed by the main scanning mirror set 61. This interpolation results in a high density exposure. dot line 20 having twice the resolution of the odd number exposure dot line 21 or even number exposure dot line 22. Where the high density exposure dot line 20 is used in forming an image, the main scanning mirror set 61 and interpolative main scanning mirror set 61 will be referred to collectively as a print head line L.

As noted hereinbefore, the micromirror device 40 is on the market as a digital display device. Thus, the micromirror device 40 usually is available in a rectangular shape with micromirrors 41 arranged in a matrix of m rows and n columns, m being smaller than n, as shown in FIG. 5.

To make the best of this rectangular shape, a main scanning mirror set 61 here is formed of a first subset 61a having a predetermined number of micromirrors 41 selected in a direction; Q extending from one end of a diagonal of the rectangle at an angle of 45 degrees relative to the columns of micromirror device 40, and a second subset 61b having the predetermined number of micromirrors 41 selected in a direction extending from the other end of the above diagonal at an angle of 45 degrees relative to the columns of micromirror device 40. This predetermined number is selected so that an exposure dot line formed by the first subset 61a and second subset 61b be unbroken and non-overlapping. The first subset 61a and second subset 61b are shifted relative to each other by an amount: D1. The timing of exposure must be shifted appropriately in order to form a straight exposure dot line on the photographic paper 2. In this example also, an interpolative main scanning mirror set 62 is provided, which is formed of a first subset 62a and a second subset 62b.

Figure 5:
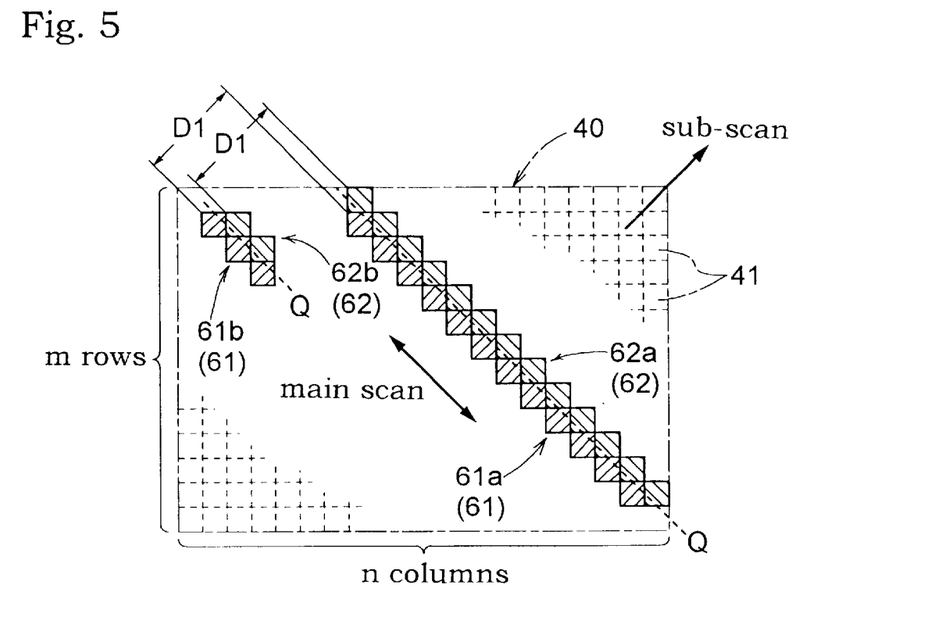
FIG. 5 is an explanatory view showing an arrangement of a main scanning mirror set and an interpolative main scanning mirror set in the micromirror device.
Figure 6:
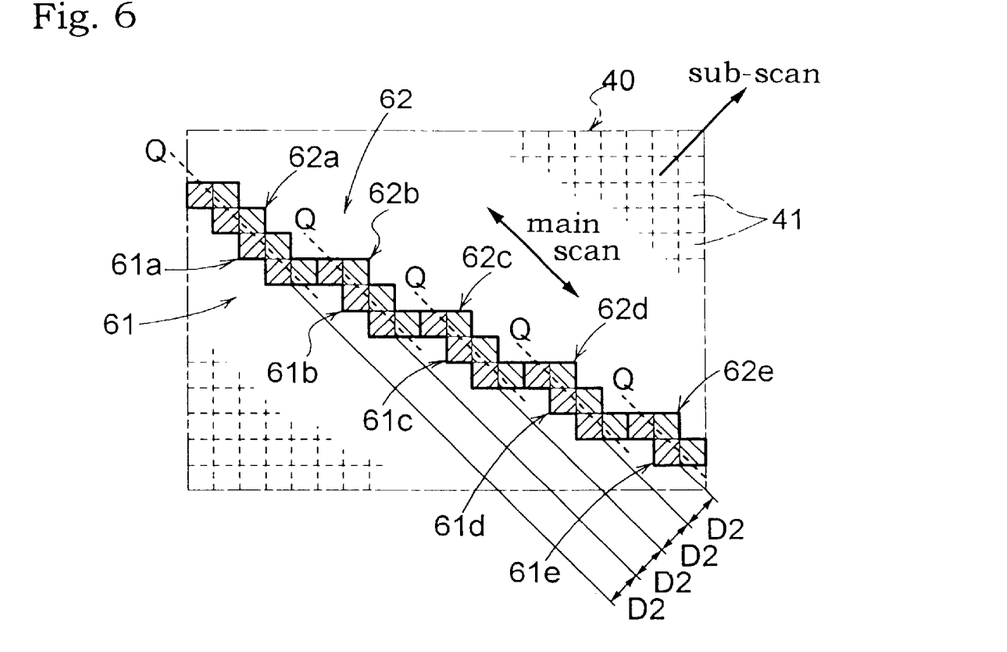
FIG. 6 is an explanatory view showing an arrangement of a main scanning mirror set and an interpolative main scanning mirror set in the micromirror device.

In the micromirror device 40 shown in FIG. 6, the way of determining subsets constituting the main scanning mirror set 61 is different from what is illustrated in FIG. 5. Here, while the main scanning mirror set 61 as a whole extends in a diagonal direction of the rectangular micromirror device 40, subsets 61a, 62b and so on are formed of micromirrors 41 selected in directions: Q at an angle of 45 degrees relative to the columns of micromirror device 40. With this main scanning mirror set 61, adjacent subsets are shifted relative to each other by a reduced amount: D2. Even where the light source has variations in luminance distribution, differences in luminance of incident light beams are negligible since micromirrors 41 forming adjacent exposure dots are disposed dose to each other. In this example, an interpolative main scanning mirror set 62 is provided, which is formed of subsets 62a, 62b and so on.

Figure 7:
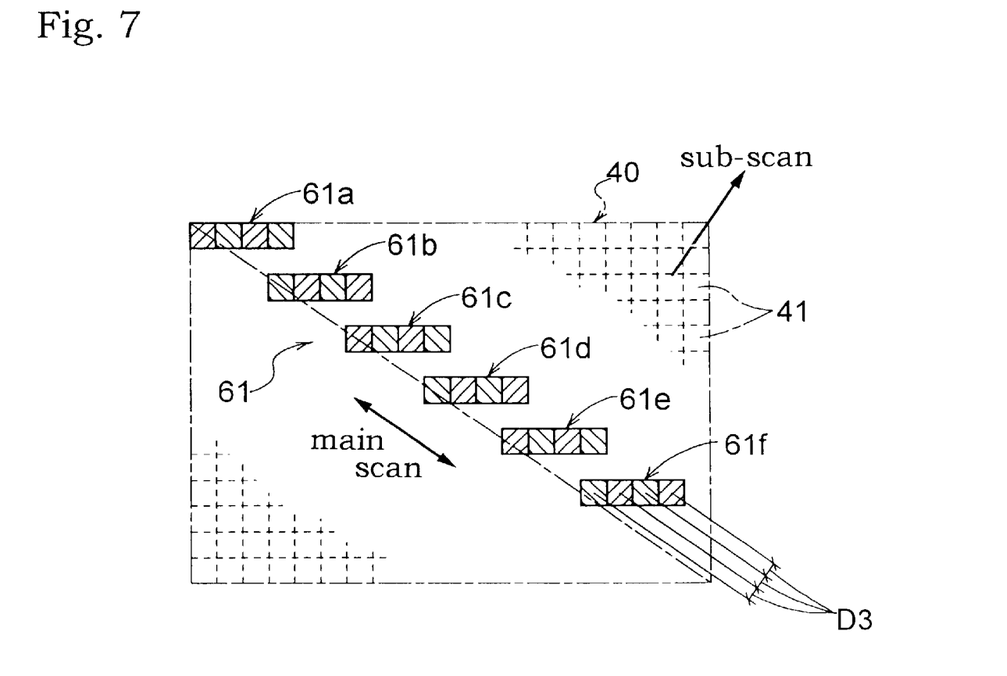
FIG. 7 is an explanatory view showing an arrangement of a main scanning mirror set in the micromirror device.

In the micromirror device 40 shown in FIG. 7, subsets 61a, 61b and so on constituting the main scanning mirror set 61 which as a whole extends in a diagonal direction of the rectangle are selected from predetermined rows of the micromirror matrix to form a continuous, straight exposure dot line. Each exposure dot formed by this main scanning mirror set 61 is separate from adjacent exposure dots, as distinct from those formed by the main scanning mirror set 61 and the interpolative main scanning mirror set 62 described hereinbefore. However, these exposure dots are minute, and result in no serious drawback in image quality. It should be noted that the micromirrors 41 constituting the subsets 61a, 61b and so on are shifted relative to each other by an amount: D3 in the sub-scanning direction. Thus, a control is effected to shift the timing of exposure appropriately in order to form a straight exposure dot line.

Figure 8:
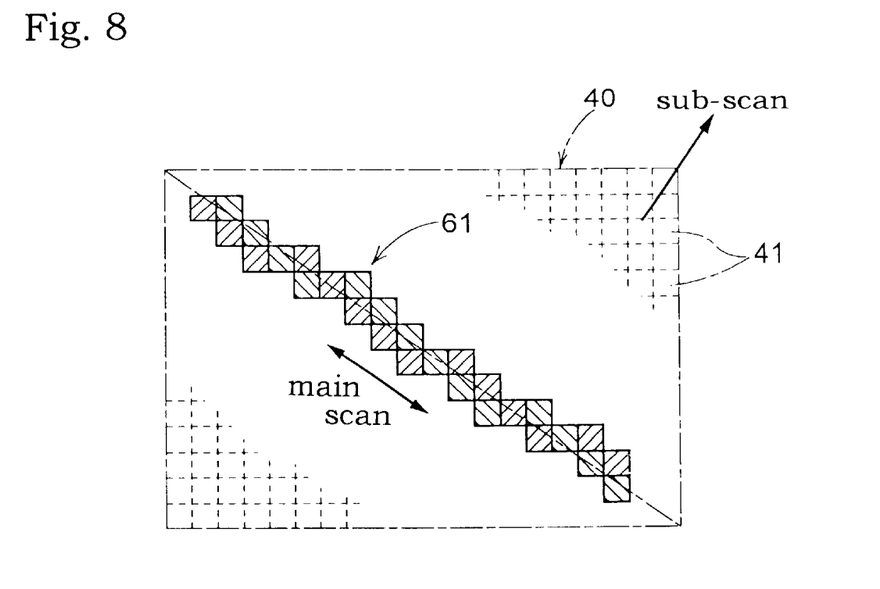
FIG. 8 is an explanatory view showing an arrangement of a main scanning mirror set in the micromirror device.

In the micromirror device 40 shown in FIG. 8, micromirrors 41 constituting the main scanning mirror set 61 are selected to be as close to a diagonal of the rectangular micromirror device 40 as possible, and to form exposure dots continuing in a straight line. This results in an increase in the number of micromirrors 41 that constitute the main scanning mirror set 61, thereby realizing high resolution. However, these micromirrors 41 are slightly shifted relative to one another in the sub-scanning direction, thereby requiring a fine shift control for adjustment.

Figure 9:
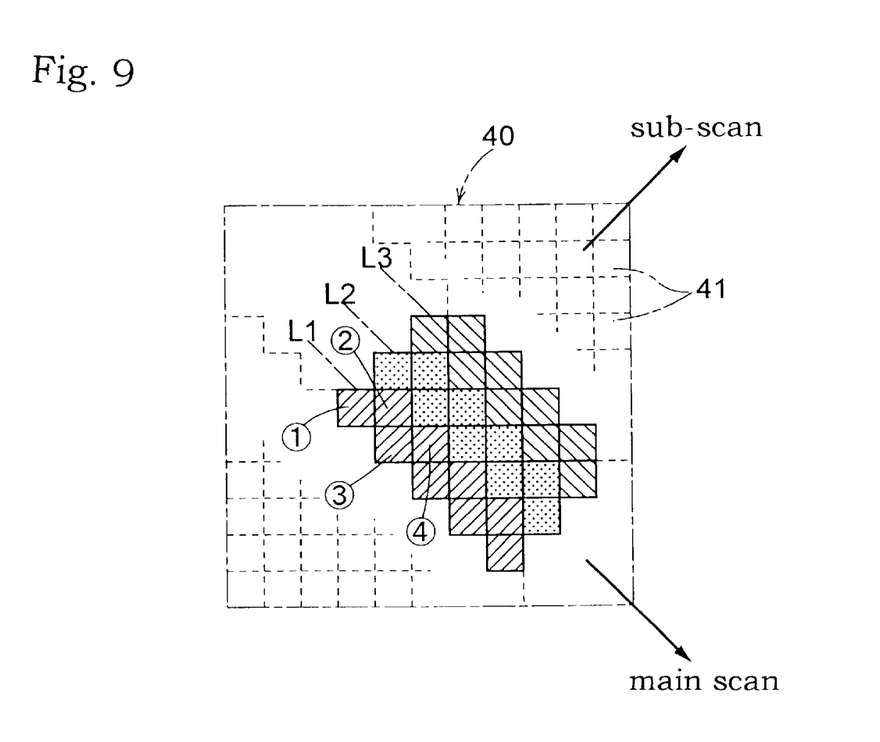
FIG. 9 is a schematic view of a micromirror device with a plurality of print head lines set thereto.
Figure 10:
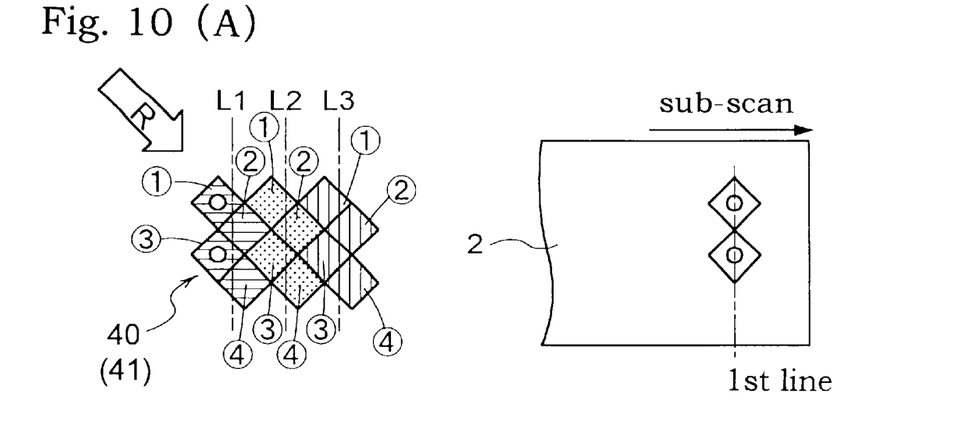
FIG. 10 is an explanatory view of an RGB superposing exposure process using the plurality of print head lines.
Figure 11:
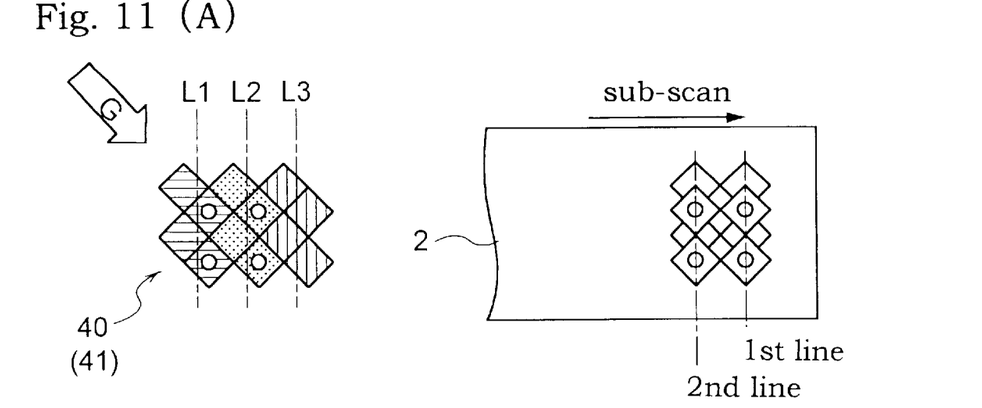
FIG. 11 is an explanatory view of an RGB superposing exposure process using the plurality of print head lines.

An exposing process for forming a color image will be described with reference to FIGS. 9 through 11. In this process, three print head lines, each consisting of main scanning mirror set 61 and interpolative mirror set 62, are used to superimpose exposure dots of RGB colors completely. FIG. 9 is a schematic view of a micromirror device 40 with a first print head line L1, a second print head line L2 and a third print head line L3 set thereto. The following steps are executed to form a color image by using this micromirror device 40. For simplicity of description, reference will be made only to Nos. 1 to 4 micromirrors 41 in each print head line.

Step 1 (FIG. 10A)

The micromirror device 40 is controlled in timed relationship with rotation of rotating filter 52, and a red light beam: R is transmitted to the micromirror device 40. At this time, only the odd-numbered, i.e. the first and third, micromirrors 41 of the first print head line L1 are tilted to the exposing posture, the other micromirrors being tilted to the non-exposing posture. As a result, the first print head line L1 forms a red odd-number exposure dot line on a first line of photographic paper 2.

Step 2 (FIG. 10B)

Only the even-numbered, i.e. the second and fourth, micromirrors 41 of the first print head line L1 are tilted to the exposing posture, the other micromirrors being tilted to the non-exposing posture. As a result, the first print head line L1 forms a red even-number exposure dot line on the first line of photographic paper 2.

Step 3 (FIG. 10C)

At this stage, the red filter region of rotating filter 52 has moved out of the optical axis, and the green filter region is now on the optical axis to transmit a green light beam: G to the micromirror device 40. Only the odd-numbered micromirrors 41 of the first print head line L1 and second print head line L2 are tilted to the exposing posture, the other micromirrors being tilted to the non-exposing posture. As a result, the first print head line L1 forms a green odd-number exposure dot line on the first line of photographic paper 2, and the second print head line L2 forms a green odd-number exposure dot line on a second line of photographic paper 2.

Step 4 (FIG. 11A)

Only the even-numbered micromirrors 41 of the first print head line L1 and second print head line L2 are tilted to the exposing posture, the other micromirrors being tilted to the non-exposing posture. As a result, the first print head line L1 forms a green even-number exposure dot line on the first line of photographic paper 2, and the second print head line L2 forms a green even-number exposure dot line on the second line of photographic paper 2.

Step 5 (FIG. 11B)

At this stage, the green filter region of rotating filter 52 has moved out of the optical axis, and the blue filter region is now on the optical axis to a transmit a blue light beam: B to the micromirror device 40. Only the odd-numbered micromirrors 41 of the first print head line L1, second print head line L2 and third print head line L3 are tilted to the exposing posture, the other micromirrors being tilted to the non-exposing posture. As a result, the first print head line L1 forms a blue odd-number exposure dot line on the first line of photographic paper 2, the second print head line L2 forms a blue odd-number exposure dot line on the second line of photographic paper 2, and the third print head line L2 forms a blue odd-number exposure dot line on a third line of photographic paper 2.

Step 6 (FIG. 11C)

Only the even-numbered micromirrors 41 of the first print head line L1, second print head line L2 and third print head line L3 are tilted to the exposing posture, the other micromirrors being tilted to the non-exposing posture. As a result, the first print head line L1 forms a blue even-number exposure dot line on the first line of photographic paper 2, the second print head line L2 forms a blue even-number exposure dot line on the second line of photographic paper 2, and the third print head line L2 forms a blue even-number exposure dot line on the third line of photographic paper 2. This completes color exposure for the first line of photographic paper 2, with a high density exposure dot line being formed on the first line by all the RGB color light beams.

Thereafter, the mirror operations of step 5 (FIG. 11B) and step 6 (FIG. 11C) are repeated for each exposure color. At the final stage, step 1 (FIG. 10A) to step 3 (FIG. 10C) and step 4 (FIG. 11A) are executed in reversed order to complete exposure of the entire image. In the above exposing process, a 24-bit full color image is formed by adjusting the period for holding the micromirrors in the exposing posture in 256 stages (8 bits), for example.

Figure 12:
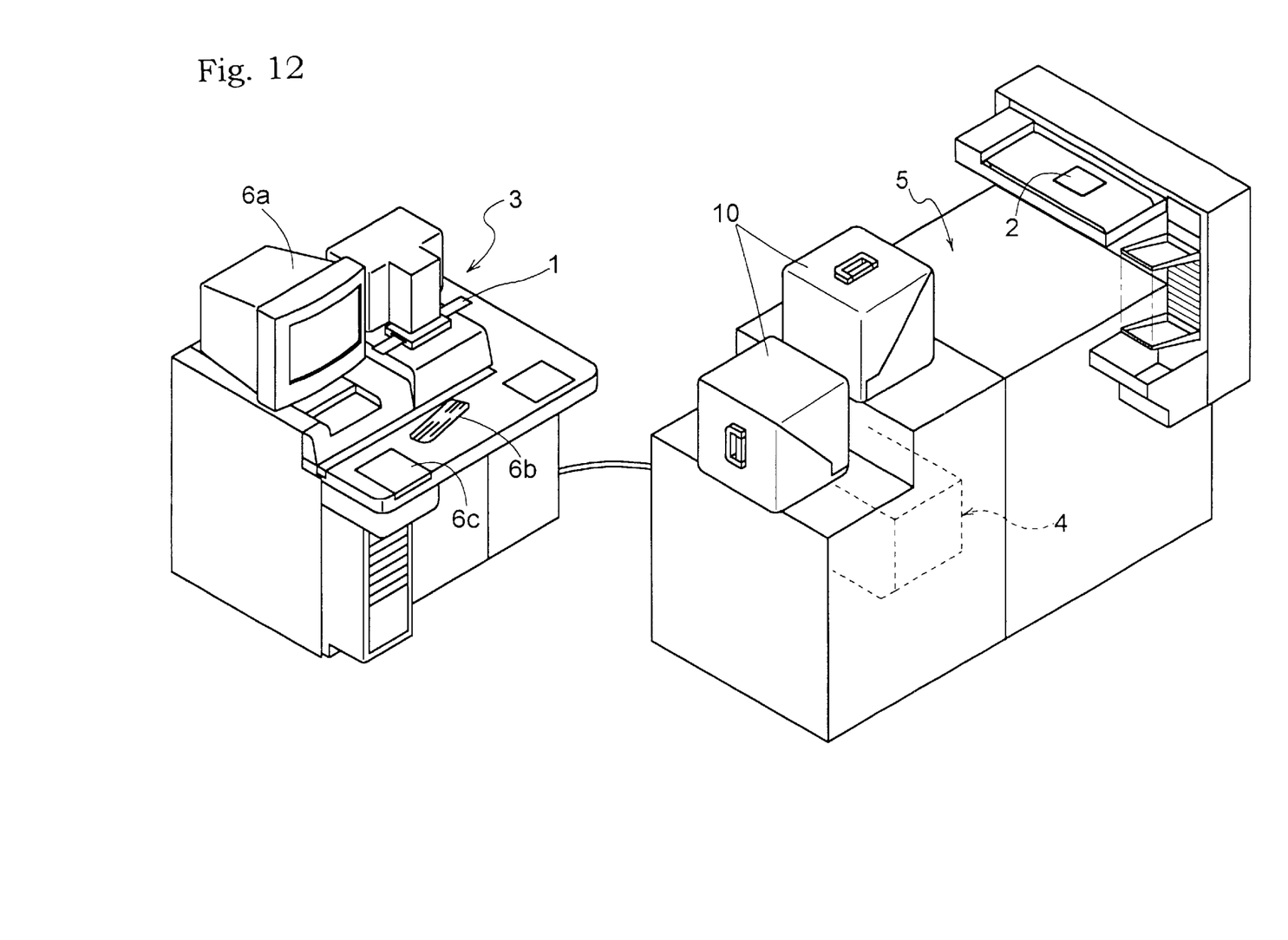
FIG. 12 is a perspective view of a silver salt photographic digital printer which is one example of image forming apparatus according to this invention.
Figure 13:
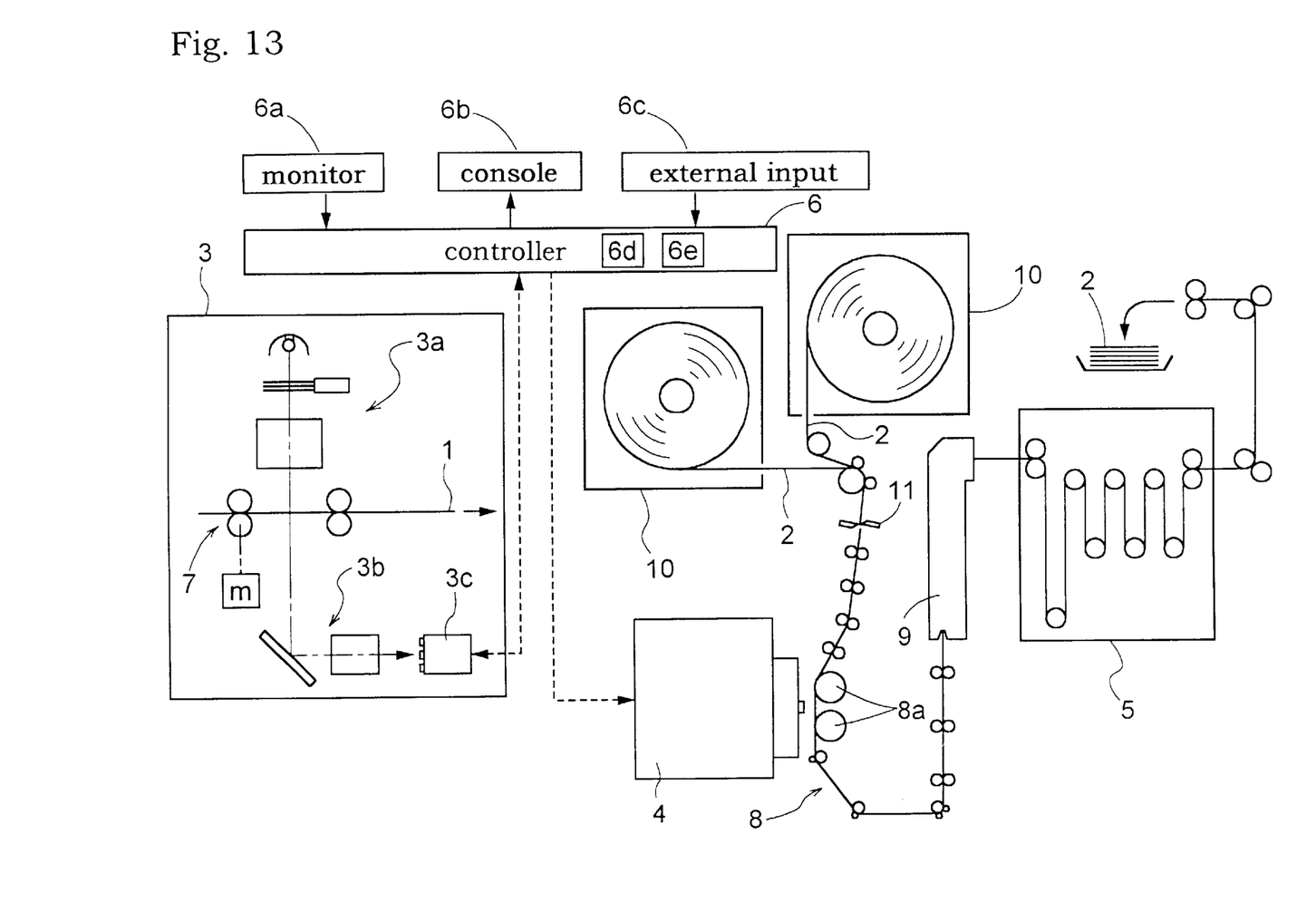
FIG. 13 is a block diagram of the silver salt photographic digital printer shown in FIG. 12.

In the above example, only one print head line is set for exposing each color. Where the micromirror device 40 has a plurality of print head lines set for exposing each color, an exposure dot of one color may be formed in the same position by using a plurality of micromirrors 41 under similar shift control. This allows a reduced exposure time to be allocated to each micromirror, thereby to speed up the exposing process. Next, a silver salt photographic digital printer will be described with reference to the drawings, as one example of line exposure type image forming apparatus employing the exposure engine 4 according to this invention. FIG. 12 is a perspective view of this silver salt photographic digital printer. FIG. 13 shows a block diagram of the printer. This silver salt photographic digital printer includes a film scanner 3 for acquiring frame images of photographic film 1 as digital image data, a controller 6 for processing the digital image data acquired (hereinafter simply called image data) to makes print data, a DMD type exposure engine 4 for forming, based on the print data, images corresponding to the frame images on photographic paper 2 acting as a photosensitive material, and a developing station 5 for developing exposed photographic paper 2. The photographic paper 2 developed at the developing station 5 is passed through a drying stage, and discharged as finished prints having copy images. Numeral 7 denotes a film transport mechanism for transporting the film 1 to the film scanner 3. Numeral 8 denotes a paper transport mechanism for drawing the photographic paper 2 out of paper magazines 10 and feeding the exposed photographic paper 2 to the developing station 5. Both transport mechanisms are controlled by the controller 6. The paper transport mechanism 8 includes a sub-scan moving mechanism 8a for transporting the photographic paper 2 in the sub-scanning direction perpendicular to light beams emitted from the exposure engine 4 in a line extending in the main scanning direction.

The controller 6 has, connected thereto, a monitor 6a for displaying various processing information, a console 6b for inputting various processing instructions, and an external image input device 6c for receiving image data from image data recording media such as a memory card, MO and FD, or digital image data transmitted through communication lines. With this external image input device 6c, the silver salt photographic digital printer can handle, as original images inputted, not only images on photographic film, but also images photographed with digital cameras and CG images made with computer graphics software.

The film scanner 3 includes illuminating optics 3a for illuminating the film 1 with light beams having color and intensity distributions adjusted, image pickup optics 3b for optically processing the light beams transmitted through the film 1, and a photoelectric converter 3c for converting the light beams received from the image pickup optics 3b into charge images acting as slit images.

The photoelectric converter 3c includes a CCD sensor unit, a sample hold (S/H) circuit, an analog-to-digital converter, and a sensor drive circuit which are all known per se. The CCD sensor unit has three CCD sensors. Each CCD sensor is a line sensor with numerous (e.g. 5,000) CCD elements arranged in the main scanning direction, i.e. transversely of the film 1. In time of a main scan, the sensor drive circuit controls a charge storing operation and storing time of each CCD sensor. Each CCD sensor has a color filter applied to an image pickup plane thereof for allowing passage of only blue components, red components or green components of light beams. The sample hold circuit sample-holds pixel signals outputted from each CCD sensor, and generates an image signal having a series of pixel signals. The analog-to-digital converter converts each pixel signal constituting the image signal into a digital signal in a predetermined number of bits (e.g. 12 bits). The digital image data obtained by the photoelectric converter 3c and acting as the RGB signals are transmitted to the controller 6.

The photographic paper 2 is stored in the form of rolls in the paper magazines 10, cut by a cutter not shown to proper lengths according to print sizes, and exposed by the exposure engine 4. Exposed photographic paper 2 is distributed by a distributing device 9 from a serial transport to a parallel transport in up to three strips for loading into the developing station 5. With this distribution process, an adjustment is made between a short exposure time for the photographic paper 2 which results from the use of the micromirror device 40, and a long developing time which is due to a chemical process required. The controller 6 includes a microcomputer system acting as its core and having a CPU, ROM, RAM and interface circuits, and fulfills, by means of hardware, software or both, various functions required of this silver salt photographic printer. To perform the functions relating to this invention, the controller 5 includes a film transport control unit, a film scanner control unit, a paper transport control unit, an image processing unit 6d and a micromirror device control unit 6e.

The image processing unit 6d performs various image processing such as outline enhancement and image synthesis, which are known per se, for image data transmitted from the photoelectric converter 3c of film scanner 3 to a working memory in the controllers 6, or image data acquired with a digital camera and directly transmitted from the external image input device 6c noted hereinbefore. Generally, such digital image processing is carried out while displaying, on the monitor 6a, a simulated image of a print output made from acquired digital image data. The image processing may be carried out automatically, or manually by the operator instructing a desired processing from the console 6b. Image data processed as described above is converted into print data and transmitted to the micromirror device control unit 6e.

The micromirror device control unit 6e has a mirror control unit for effecting, based on the print data, posture control of micromirrors 41 constituting each print head line to act as a print head, and a light source control unit for controlling rotation of rotating filter 52. With these controls, the photographic paper 2 moving in the sub-scanning direction is exposed line by line to form a full color image.

In the above embodiment, the micromirror device 40, or a selected line of micromirrors 41 constituting a main scan mirror set, is tilted 45 degrees relative to the columns of the micromirror matrix, or in a direction along a diagonal of the micromirror matrix. It is, of course, within the scope of this invention to tilt the micromirrors 41 to any different angle.

What is claimed is:

1. A line exposure type image forming apparatus for exposing a photosensitive material in an exposure position, comprising:

a light source;

a sub-scan moving mechanism for moving said photosensitive material relative to said exposure position;

a micromirror device comprising a plurality of micromirrors arranged in a matrix of rows and columns and tiltable between an exposing posture for reflecting light incident from said light source to a predetermined exposure position on said photosensitive material and a non-exposing posture for reflecting the light to a location other than said photosensitive material;

wherein said micromirror device is disposed such that an imaginary line linking imaging positions on said photosensitive material with at least one respective micromirror in a predetermined row is at an angle to a direction of relative movement of said photosensitive material, whereby an exposure dot line is produced on said photosensitive material in a main scanning direction perpendicular to said direction of relative movement by a main scanning mirror set formed of micromirrors selected in a direction at an angle to a direction of the columns of said micromirror device; and a mirror controller for controlling the postures of said micromirrors in response to image signals, wherein said main scanning mirror set is formed of micromirrors selected in a direction along a diagonal of said micromirror device.

2. An image forming apparatus according to claim 1, wherein said micromirrors are arranged in a matrix of m rows and n columns, m being smaller than n, and said main scanning mirror set is formed of a plurality of subsets each having a predetermined number of micromirrors selected in a direction at an angle of 45 degrees to the direction of the columns of said micromirror device.

3. A line exposure type image forming apparatus for exposing a photosensitive material in an exposure position, comprising:

a light source;

a sub-scan moving mechanism for moving said photosensitive material relative to said exposure position;

a micromirror device comprising a plurality of micromirrors arranged in a matrix of rows and columns and tiltable between an exposing posture for reflecting light incident from said light source to a predetermined exposure position on said photosensitive material and a non-exposing posture for reflecting the light to a location other than said photosensitive material;

wherein said micromirror device is disposed such that an imaginary line linking imaging positions on said photosensitive material with at least one respective micromirror in a predetermined row is at an angle to a direction of relative movement of said photosensitive material, whereby an exposure dot line is produced on said photosensitive material in a main scanning direction perpendicular to said direction of relative movement by a main scanning mirror set formed of micromirrors selected in a direction at an angle to a direction of the columns of said micromirror device; and a mirror controller for controlling the postures of said micromirrors in response to image signals, wherein said micromirrors are arranged in the matrix of m rows and n columns, m being smaller than n, and said main scanning mirror set is formed of a first subset having a predetermined number of micromirrors selected in a direction extending from one end of a diagonal of said matrix at an angle of 45 degrees relative to the columns of said micromirror device, and a second subset having a predetermined number of micromirrors selected in a direction extending from the other end of said diagonal at an angle of 45 degrees relative to the columns of said micromirror device.

4. A line exposure type image forming apparatus for exposing a photosensitive material in an exposure position, comprising:

a light source;

a sub-scan moving mechanism for moving said photosensitive material relative to said exposure position;

a micromirror device comprising a plurality of micromirrors arranged in a matrix of rows and columns and tiltable between an exposing posture for reflecting light incident from said light source to a predetermined exposure position on said photosensitive material and a non-exposing posture for reflecting the light to a location other than said photosensitive materials;

wherein said micromirror device is disposed such that an imaginary line linking imaging positions on said photosensitive material with at least one respective micromirror in a predetermined row is at an angle to a direction of relative movement of said photosensitive material, whereby an exposure dot line is produced on said photosensitive material in a main scanning direction perpendicular to said direction of relative movement by a main scanning mirror set formed of micromirrors selected in a direction at an angle to a direction of the columns of said micromirror device; and a mirror controller for controlling the postures of said micromirrors in response to image signals, wherein at least three main scanning mirror sets are formed to produce exposure dots, each struck by light beams from different micromirrors for color exposure.

5. A line exposure type image forming apparatus for exposing a photosensitive material in an exposure position, comprising:

a light source;

a sub-scan moving mechanism for moving said photosensitive material relative to said exposure position;

a micromirror device comprising a plurality of micromirrors arranged in a matrix of rows and columns and tiltable between an exposing posture for reflecting light incident from said light source to a predetermined exposure position on said photosensitive material and a non-exposing posture for reflecting the light to a location other than said photosensitive material;

wherein said micromirror device is disposed such that an imaginary line linking imaging positions on said photosensitive material with at least one respective micromirror in a predetermined row is at an angle to a direction of relative movement of said photosensitive material, whereby an exposure dot line is produced on said photosensitive material in a main scanning direction perpendicular to said direction of relative movement by a main scanning mirror set formed of micromirrors selected in a direction at an angle to a direction of the columns of said micromirror device; and a mirror controller for controlling the postures of said micromirrors in response to image signals, wherein said main scanning mirror set, and an interpolative main scanning mirror set formed of micromirrors for producing exposure dots between exposure dots produced by the micromirrors of said main scanning mirror set, produce an exposure dot line of increased resolution.

6. A line exposure type image forming apparatus for exposing a photosensitive material in an exposure position, comprising:

a light source;

a sub-scan moving mechanism for moving said photosensitive material relative to said exposure position;

a micromirror device comprising a plurality of micromirrors arranged in a matrix of rows and columns and tiltable between an exposing posture for reflecting light incident from said light source to a predetermined exposure position on said photosensitive material and a non-exposing posture for reflecting the light to a location other than said photosensitive material;

wherein said micromirror device is disposed such that an imaginary line linking imaging positions on said photosensitive material with at least one respective micromirror in a predetermined row is at an angle to a direction of relative movement of said photosensitive material, whereby an exposure dot line is produced on said photosensitive material in a main scanning direction perpendicular to said direction of relative movement by a main scanning mirror set formed of micromirrors selected in a direction at an angle to a direction of the columns of said micromirror device such that the micromirrors from adjacent rows are used to form the exposure dot line; and a mirror controller for controlling the postures of said micromirrors in response to image signals.

7. The line exposure type image forming apparatus of claim 6, wherein said main scanning mirror set is formed of micromirrors selected in a direction along a diagonal of said micromirror device.

8. An image forming apparatus according to claim 7, wherein said micromirrors are arranged in a matrix of m rows and n columns, m being smaller than n, and said main scanning mirror set is formed of a plurality of subsets each having a predetermined number of micromirrors selected in a direction at an angle of 45 degrees to the direction of the columns of said micromirror device.

9. A line exposure type image forming apparatus according to claims 6, wherein said micromirrors are arranged in the matrix of m rows and n columns, m being smaller than n, and said main scanning mirror set is formed of a first subset having a predetermined number of micromirrors selected in a direction extending from one end of a diagonal of said matrix at an angle of 45 degrees relative to the columns of said micromirror device, and a second subset having a predetermined number of micromirrors selected in a direction extending from the other end of said diagonal at an angle of 45 degrees relative to the columns of said micromirror device.

10. A line exposure type image forming apparatus according to claim 6, wherein at least three main scanning mirror sets are formed to produce exposure dots, each struck by light beams from different micromirrors for color exposure.

11. A line exposure type image forming apparatus according to claim 6, wherein said main scanning mirror set, and an interpolative main scanning mirror set formed of micromirrors for producing exposure dots between exposure dots produced by the micromirrors of said main scanning mirror set, produce an exposure dot line of increased resolution.

12. A line exposure type image forming apparatus for exposing a photosensitive material in an exposure position, comprising:

a light source;

a sub-scan moving mechanism for moving said photosensitive material relative to said exposure position;

a micromirror device comprising a plurality of micromirrors arrange d in a matrix of rows and columns and tiltable between an exposing posture for reflecting light incident from said light source to a predetermined exposure position on said photosensitive material and a non-exposing posture for reflecting the light to a location other than said photosensitive material;

wherein said micromirror device is disposed such that an imaginary line linking imaging positions on said photosensitive material with at least one respective micromirror in a predetermined row is at an angle to a direction of relative movement of said photosensitive material, whereby an exposure dot line is produced on said photosensitive material in a main scanning direction perpendicular to said direction of relative movement by a main scanning mirror set formed of micromirrors selected in a direction at an angle to a direction of the columns of said micromirror device such that the micromirrors from successive rows are used to form the exposure dot line; and a mirror controller for controlling the postures of said micromirrors in response to image signals.

13. The line exposure type image forming apparatus of claim 12, wherein said main scanning mirror set is formed of micromirrors selected in a direction along a diagonal of said micromirror device.

14. An image forming apparatus according to claim 13, wherein said micromirrors are arranged in a matrix of m rows and n columns, m being smaller than n, and said main scanning mirror set is formed of a plurality of subsets each having a predetermined number of micromirrors selected in a direction at an angle of 45 degrees to the direction of the columns of said micromirror device.

15. A line exposure type image forming apparatus according to claims 12, wherein said micromirrors are arranged in the matrix of m rows and n columns, m being smaller than n, and said main scanning mirror set is formed of a first subset having a predetermined number of micromirrors selected in a direction extending from one end of a diagonal of said matrix at an angle of 45 degrees relative to the columns of said micromirror device, and a second subset having a predetermined number of micromirrors selected in a direction extending from the other end of said diagonal at an angle of 45 degrees relative to the columns of said micromirror device.

16. A line exposure type image forming apparatus according to claim 12, wherein at least three main scanning mirror sets are formed to produce exposure dots, each struck by light beams from different micromirrors for color exposure.

17. A line exposure type image forming apparatus according to claim 12, wherein said main scanning mirror set, and an interpolative main scanning mirror set formed of micromirrors for producing exposure dots between exposure dots produced by the micromirrors of said main scanning mirror set, produce an exposure dot line of increased resolution.

* * * * *